T. A. BELL.
SHOCK ABSORBER FOR VEHICLES.
APPLICATION FILED NOV. 10, 1914.

1,157,494.

Patented Oct. 19, 1915.

Witnesses.

Inventor
T. A. Bell.
By Atty

UNITED STATES PATENT OFFICE.

THOMAS ANDREW BELL, OF KEW, MELBOURNE, VICTORIA, AUSTRALIA.

SHOCK-ABSORBER FOR VEHICLES.

1,157,494.  Specification of Letters Patent.  Patented Oct. 19, 19.

Application filed November 10, 1914. Serial No. 871,374.

*To all whom it may concern:*

Be it known that I, THOMAS ANDREW BELL, a subject of the King of Great Britain and Ireland, and a resident of the post-town of Kew, a suburb of the city of Melbourne, in the county of Bourke, State of Victoria, Commonwealth of Australia, (whose post-office address is 24 Queen street, in the said post-town of Kew,) have invented certain new and useful Improvements in Shock-Absorbers for Vehicles, of which the following is a specification.

This invention relates to shock absorbing devices interposed between a vehicle axle or axles and the body thereof to nullify the rebound of the vehicle springs when road inequalities are encountered. Hitherto numerous devices have been proposed, particularly for use with motor driven vehicles, whereby the rebound is reduced and greater comfort provided for the occupants of the vehicle. Many of these devices have been of a complicated nature, liable to breakage, and ineffective or not sufficiently smooth in action. Spring devices are particularly objectionable in some of these respects.

The object of the present invention is to provide a cheap, simple, easily applied absorbing or nullifying device consisting of but few parts none of which are liable to derangement and which do not require close attention.

The invention has proven very efficient when applied to a motor car, an absorber being employed near each end of the front and back axles.

What are considered to be the features of novelty will be pointed out in the appended claims.

Figure 1:
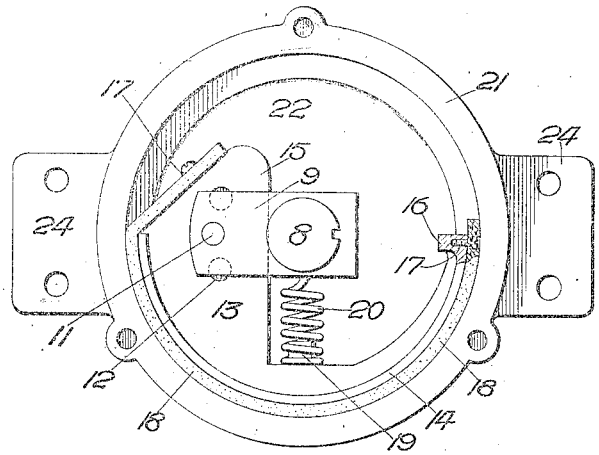
Figure 2:
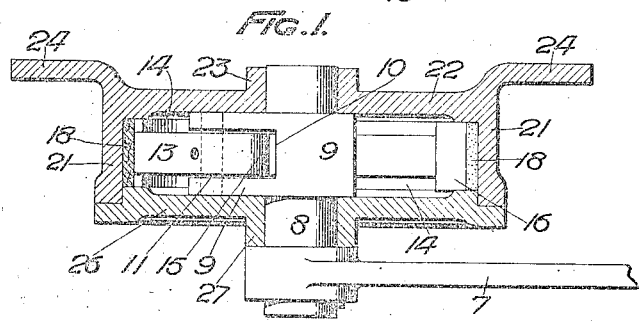
Figure 3:
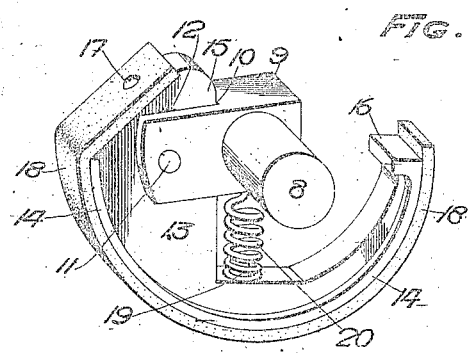
Figure 4:
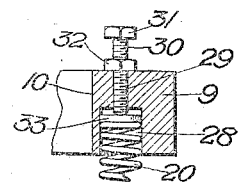
Figure 5:
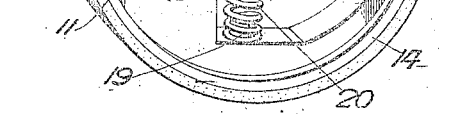
Figure 5:
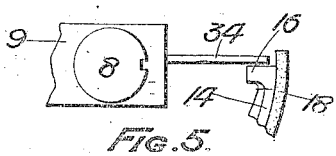
Figure 6:
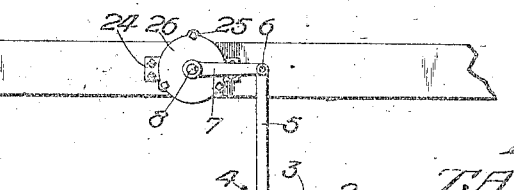

Referring to the drawings which form a part of this specification,—Figure 1 is a side view of the invention, a closing plate and a lever being removed for convenience of illustration. Fig. 2 is a sectional plan of Fig. 1. Fig. 3 is a perspective view of a crank shaft and a brake segment. Fig. 4 is a sectional detail view of a modification. Fig. 5 is a detail view of a further modification. Fig. 6 is a side elevation showing the invention applied to portion of a vehicle between an axle spring and the body thereof.

The invention is disposed above an axle spring 2 of a vehicle to which spring is secured a plate or the like 3 carrying a pivot pin 4 pivoted to which is the lower end of a link 5 the upper end of which is pivoted by a pivot pin 6 to one end of a lever 7. The other end of the lever 7 is secured to the outer end of a crank shaft 8 having a crank arm 9 formed in which is a passageway having a back 10. Extending across the passageway and carried by the crank arm 9 is a crank pin 11. The crank pin 11 passes through one of a series of adjusting holes 12 formed in the web 13 of a brake segment provided with a rim 14. The segment has a free advancing end terminating in or providing a limit stop 15 and a retarding return end terminating in an inwardly projecting protuberance 16.

Secured to the rim 14 of the brake segment, by screws 17 or the like, is a brake lining 18 having a free advancing end and a retarding return end to correspond with the segment. The brake lining is preferably formed of canvas or other suitable material embedded in which is wire mesh or wire threads.

Projecting inwardly from the rim 14 is a protuberance or stud 19 engaging which is the outer end of a helical spring 20, the inner end of which passes into a hole formed in the crank arm 9.

Engaged by the brake lining 18 is a drum 21 having a back 22 provided with a boss 23 and secured by lugs 24 or the like to the vehicle chassis or body. Secured by bolts 25 or the like to the drum 20 is a closing plate 26 having a boss 27. The crank shaft 8 is mounted in the bosses 23 and 27.

In a modification a spring chamber, indicated at 28, is formed in the crank arm 9. Passing from the chamber 28 is a threaded hole, indicated at 29, accommodating the threaded shank 30 of an adjusting screw having a head 31 and a lock nut 32. Within the chamber below the screw is a plunger or disk 33. The inner end of the spring 20 bears against the plunger or disk 33 within the chamber 28 the tension of the spring 20 being adjusted by turning the threaded shank 30. In a further modification, the spring 20 may be dispensed with and a crank extension 34 project from the crank arm 9 into close proximity or adjacent to the protuberance 16 of the brake segment. The outer end of the extension just clears the protuberance.

In applying the invention to a motor car or the like an absorber is provided for each spring of the vehicle and therefore adjacent each wheel thereof.

The invention operates as follows:—Presuming a road wheel of the vehicle descends into a hollow the outer end of the lever 7 by means of the link 5 also descends partially rotating the crank shaft 8 and moving the brake segment within the drum 21. The segment advances freely and without retardation. Immediately the axle of the vehicle rises when leaving the hollow the link 5 also rises operating the lever 7 and crank shaft 8 in the reverse direction. The spring 20 retains the brake lining 18 in contact with the drum 21 and on account of the position of the crank pin 11 in relation to the web 13 of the brake segment the retarding return end of the said segment grips the drum 21 and nullifies the rebound of the spring, the movement of the segment being slow. By varying the position of the crank pin 11 in relation to the web 13 by means of the adjusting holes 12 the retarding movement of the brake segment may be varied to accord with varying circumstances and loads.

In the modification seen in Fig. 4 the tension of the spring 20 may be varied. In the modification seen in Fig. 5 the spring may be dispensed with the protuberance 16 immediately engaging the extension 34 and retaining the retarding return end of the brake segment in contact with the drum 21 upon the return movement of the said segment. The extension 34, therefore, takes the place of the spring 20.

Having now described my invention what I claim as new and desire to secure by Letters Patent is:—

1. Improvements in shock absorbers for vehicles consisting in a drum, a crank shaft having a crank pin mounted in said drum, a brake segment having a free advancing end pivoted to the crank pin, means for adjusting the crank pin in relation to the segment, said advancing end forming a limit stop to engage the crank, a brake lining carried by the segment and engaging the drum, and a spring disposed between the segment and crank shaft.

2. Improvements in shock absorbers for vehicles, consisting in a drum, a crank shaft having a crank pin mounted therein, a brake segment having an advancing end pivoted to the crank pin, a series of adjusting holes in said advancing end, said advancing end forming a limit stop to engage the crank, a spring disposed between the crank shaft and the segment, and means for adjusting the tension of said spring.

3. Improvements in shock absorbers for vehicles, consisting in a drum, a crank shaft having a crank pin mounted therein, a brake segment having an advancing end pivoted to the crank pin, a series of adjusting holes formed in said advancing end, said advancing end forming a limit stop, a brake lining secured to the segment, a spring engaging the segment, a spring chamber formed in the crank shaft, said spring projecting into said chamber, a plunger within the chamber and engaging the spring, and an adjusting screw engaging the plunger.

4. Improvements in shock absorbers for vehicles, consisting in a drum having a back, lugs projecting from said back, a closing plate secured to the drum, a crank shaft mounted within the drum, said shaft having a crank pin, a brake segment having a web pivoted to the crank pin, a series of adjusting holes formed in said web, a rim carried by the web, a brake lining secured to the rim, said segment having a free advancing end forming a limit stop, a protuberance projecting from the web, a spring encircling said protuberance at its one end, the other end of the spring being secured to the crank shaft, a lever secured to one end of the crank shaft, and a link pivoted to the lever, said link being operated by the road inequalities.

5. Improvements in shock absorbers for vehicles, consisting in a drum having a back, lugs projecting from said back and secured to the vehicle, a closing plate secured to said drum, a crank shaft mounted in said drum, said shaft having a crank pin, a brake segment having a web, said web having a free advancing end and a retarding return end, the advancing end of the web being pivoted to the crank pin, a series of adjusting holes being formed in the advancing end of the web, a rim carried by the web, a brake lining carried by the rim, a protuberance projecting from the web, a spring encircling said protuberance at its one end, said crank shaft having a spring chamber formed therein, the other end of the spring projecting into said chamber, a plunger within the chamber, an adjusting screw carried by the crank shaft and engaging the plunger, a lever secured to one end of the crank shaft, and a link pivoted to the lever, said link being operated by the road inequalities.

In testimony whereof I have hereunto affixed my signature in the presence of two subscribing witnesses.

THOMAS ANDREW BELL.

Witnesses:
  CECIL MCSLASTRIER,
  FRANK H. BAIN.